(12) United States Patent
Seifert

(10) Patent No.: US 9,355,267 B2
(45) Date of Patent: May 31, 2016

(54) INTEGRATED FILE LEVEL CRYPTOGRAPHICAL ACCESS CONTROL

(75) Inventor: Ryan Seifert, Pasadena, TX (US)

(73) Assignee: The University of Houston System, Houston, TX (US)

( * ) Notice: Subject to any disclaimer, the term of this patent is extended or adjusted under 35 U.S.C. 154(b) by 939 days.

(21) Appl. No.: 12/661,947

(22) Filed: Mar. 26, 2010

(65) Prior Publication Data

US 2010/0257372 A1 Oct. 7, 2010

Related U.S. Application Data

(60) Provisional application No. 61/211,163, filed on Mar. 26, 2009.

(51) Int. Cl.
*H04L 29/06* (2006.01)
*G06F 21/62* (2013.01)
*G06F 21/60* (2013.01)

(52) U.S. Cl.
CPC .......... *G06F 21/6218* (2013.01); *G06F 21/602* (2013.01)

(58) Field of Classification Search
CPC ................................ H04L 12/00; G06F 9/00
See application file for complete search history.

(56) References Cited

U.S. PATENT DOCUMENTS

| | | | |
|---|---|---|---|
| 2003/0217262 A1* | 11/2003 | Kawai et al. | 713/153 |
| 2008/0243701 A1* | 10/2008 | von Mueller | 705/65 |
| 2009/0077371 A1* | 3/2009 | Powell et al. | 713/152 |

* cited by examiner

*Primary Examiner* — Joseph P Hirl
*Assistant Examiner* — Leynna Truvan
(74) *Attorney, Agent, or Firm* — Benjamin Aaron Adler

(57) ABSTRACT

Provided herein are systems and methods for an Integrated File Level Cryptographical Access Control (IFLCAC). The system comprises, on a local computer, an encryption database to store information relating to encrypted files and encryption algorithms, a user interface communicatively linked to the encryption database, an administrator interface communicatively linked to the encryption database independently of the user interface, and a file system gateway communicatively linked to the encryption database that resides above and operates independently of the file system and transparently to any calling application on the local computer. Also provided are methods of using the IFLCAC system and a computer program product comprising a memory tangibly storing computer executable instructions for the IFLCAC system and method and one or more computer readable media tangibly storing computer executable instructions for the IFLCAC system and method.

22 Claims, 11 Drawing Sheets

INTEGRATED FILE LEVEL CRYPTOGRAPHICAL ACCESS CONTROL

CROSS-REFERENCE TO RELATED APPLICATIONS

This nonprovisional application claims benefit of priority under 35 U.S.C. §119(e) of provisional application U.S. Ser. No. 61/211,163, filed Mar. 26, 2009, the entirety of which is hereby incorporated by reference.

COMPUTER PROGRAM LISTING APPENDIX

Computer program listings are submitted on compact disc in compliance with 37 C.F.R. §1.96 and are incorporated by reference herein. A total of two (2) compact discs (including duplicates) are submitted herein. The files on each compact disc are listed below, but are in text format:

| Files | Size (KB) | Date Created |
| --- | --- | --- |
| Service1.txt | 40 | May 27, 2008 |
| Program.txt | 4 | May 27, 2008 |

BACKGROUND OF THE INVENTION

1. Field of the Invention

This present invention relates to the fields of encryption and digital cryptography on a computer system. More specifically, the present invention relates to securing files and ensuring authenticated access to the secured files without dependence on a single file system.

2. Description of the Related Art

Data security has become an increasingly important aspect of computing due to the integration of computing into everyday use and the popularity of the internet. Securing sensitive data commonly involves the use of digital cryptography such as symmetric and asymmetric cryptography. Symmetric cryptography utilizes the same key to encrypt and decrypt a message and is generally faster than asymmetric cryptography. Because of the speed difference between the two forms, symmetric cryptography is commonly used to secure any message of notable size, including files. Asymmetric cryptography utilizes public and private keys to encrypt and decrypt a message thereby allowing two parties who had no previous interactions to communicate securely.

To secure the sensitive data, the user can currently utilize file level cryptography, file system cryptography and virtual partition cryptography. File level cryptography grants the users the most control over which files get encrypted, how the files are stored, and the location the files are stored in with only confidential files requiring encryption. Because the method works on a file-by-file basis, every encrypted file can use a different key, although many users will habitually utilize the same key for accessing many systems, including multiple files. Also, because only the file is changed, file level encryption can be used with any type of file system because the system does not store any special data in the file. However, one major disadvantage in file level cryptography is that the user must manually select files for encryption and decryption before and after each use. As the number of encrypted files increases, the overhead on the user to manually encrypt/decrypt these files increases as well Second, updating file level cryptography can also be difficult; if the encryption algorithm in use is found to be weak the user must recall and encrypt all files secured with that algorithm. File level cryptography provides a very secure encryption process for smaller numbers of important files, but.

In file system cryptography all the data on a single file system is encrypted thereby securing all stored data. The system requests only a single password, which is used to encrypt all the data, when the drive is being mounted for access. However, because file system cryptography encrypts non-sensitive files; an unnecessary computational overhead is incurred when accessing the files. As most file access on a computer is to non-sensitive files this overhead can be substantial. The single password used to access the file system can also be a disadvantage; for example, when different users use a single computer at different times, each user would need to know the password. Also, most file system cryptography implementations utilize a proprietary file system which may not have all the properties required for use in the computing environment. In addition, during file system cryptography, when the encryption algorithm needs to be updated, all the data on the file system must be decrypted and encrypted using the new algorithm. This can be a very time extensive operation on large file systems.

Virtual partition cryptography finds a median point between file level cryptography and file system cryptography. The system creates a virtual partition and encrypts all data stored in that partition. Virtual partition cryptography maintains many of the strengths found in file system cryptography while avoiding the large performance hit commonly encountered with its use. With oversight from the user all sensitive data can be stored securely in the virtual partition, while the non-sensitive files can be stored in the non-encrypted partition. This negates the performance hit from file system cryptography, but relies on the user to alter their storage system for files.

One disadvantage virtual partition cryptography is that the user must separate sensitive and non-sensitive files. Another disadvantage is allocating the correct amount of space for the virtual partition. Upon creation the user needs to have a rough estimate of the amount of space that will be required by the sensitive files. In addition, this system is difficult to configure correctly and does not expand well as sensitive files are added. Overestimating this space results in a loss of non-sensitive file space, while underestimating results in a costly operation to increase the size of the virtual partition. Virtual partitions are encrypted using a single password, thus all data secured in the partition utilizes the same password. This functionality does not assist the many users requiring differing layers of security.

When choosing a cryptography scheme, the user must consider the underlying file system that will be utilized. File system cryptography and virtual partition (to a degree) both force the type of file system used to a supported option. If a different file system is selected for any other reason, the encryption system must be modified to fit the scheme, or as is more likely, a different encryption system implemented.

Currently, the best option for the end user is to combine file level cryptography and file system cryptography or virtual partition cryptography. This choice provides a good overall encryption scheme, with all data being encrypted with no user interaction, and sensitive data being manually encrypted and decrypted with a separate key. Unfortunately, the user must still manually encrypt and decrypt the highly sensitive files on the system. This requires that the user not to forget to secure a file after accessing it, thereby leaving the file in an unsecured state until the user rectifies the situation. Also, this will limit the total number of files that the user will deem sensitive enough to add the additional security too.

Thus, there is a recognized need in the art for improved file security system that is secure, intuitive and non-intrusive for the end user to operate, file system independent, and easy to update. The system must be secure or it would not serve the primary purpose to securing the file. The system must be intuitive and non-intrusive for the end user to operate in order to limit the amount of necessary interactions by the user. Limiting the interactions will promote the system usage and secure any sensitive information with full security. Unfortunately, no file security systems currently meet all the necessary requirements to be a complete solution for the user.

The prior art is deficient in file level cryptography systems and methods utilizing the same. More specifically, the prior art is deficient in an integrated file level cryptography system that is independent of the file system on a computer and transparent to the user. The present invention fulfills this longstanding need and desire in the art.

SUMMARY OF THE INVENTION

The present invention is directed to a system for controlling access to secure computer files. The system comprises a local computer having a memory, a processor and one or more network connections. The local computer further comprises an encryption database to store information relating to encrypted files and encryption algorithms, a user interface communicatively linked to the encryption database, an administrator interface communicatively linked to the encryption database independently of the user interface, and a file system gateway communicatively linked to the encryption database. The present invention is directed to a related system further comprising one or more applications storable on one or more computer-readable storage media and executable by the processor and a file system to store files in and to retrieve files from a data storage device in the computer.

The present invention also is directed to a method for controlling access to secure files on a local computer. The method comprises installing the system for controlling access to secure files, as described herein, onto a local computer having a memory, a processor and one or more network connections and intercepting an application call requesting access to file in a file system on the computer via the file system gateway comprising the system. The file system gateway performs the further actions of querying the encryption database to determine if the file is secured, receiving the file security information from the encryption database, sending the application request down to the file system, said file system acting upon the request and returning information retrieved from the requested file up to the file system gateway, decrypting any secured information, and returning the decrypted information to the calling application. During this method the actions of the file system gateway are transparent to the calling application.

The present invention is directed to a related method where, via the administrator interface, the method further comprises one or more steps performed by an administrator adding new encryption algorithms to a dynamic link library configuring group access files creating a list of all encrypted files in the system updating a list of available encryption algorithms and message digests, and enabling manual file encryption or file decryption of selected files, locking files against modification, flagging folders for encryption, associating an encrypted file with its encryption algorithm, and identifying users with access to the files. The present invention is directed to another related method where, via the user interface, the method further comprises one or more steps performed by a logged-in user of displaying a list of secured files, including paths to encrypted files, file modifiers and the encryption algorithm used for each file, changing a password and obtaining authentication to access a secure file. Further still the present invention is directed to a related method comprising the steps of selecting a new file to be secured, selecting an encryption algorithm, entering an authentication for the file, encrypting the selected file with the encryption algorithm, and adding the secured file to a list of secured files for the user.

The present invention is directed further to one or more computer readable media having tangibly stored thereon a plurality of instructions that, when executed by one or more processors, causes the one or more processors to perform actions to a) intercept an application call to request access to a file in a file system on a computer via the file system gateway, b) query the encryption database to determine if the file is secured, c) receive the file security information from the encryption database, d) send the application request down to the file system, e) decrypt any secured file information returned from the file system after acting upon the request, and return the decrypted information to the calling application, where the processor performs the actions transparently to the calling application. The present invention is directed to related inventions in which the one or more computer readable media store a further plurality of instructions that, when executed, cause the processor(s) to enable independently an interface for an administrator or for a logged-in user and to further perform the method steps described herein requested by the administrator and/or by the logged-in user.

The present invention is directed further still to a computer program product comprising a computer memory medium on which are tangibly stored computer readable instructions which, when executed on one or more computer processors, enables operation of the system for controlling access to secure files on a local computer described herein.

The present invention is directed further still to a computer program product comprising a computer memory medium on which are tangibly stored computer readable instructions which, when executed on one or more computer processors, perform the method for controlling access to secure files on a local computer described herein.

Other and further aspects, features, and advantages of the present invention will be apparent from the following description of the presently preferred embodiments of the invention. These embodiments are given for the purpose of disclosure.

BRIEF DESCRIPTION OF THE DRAWINGS

So that the matter in which the above-recited features, advantages and objects of the invention, as well as others which will become clear, are attained and can be understood in detail, more particular descriptions of the invention briefly summarized above may be had by reference to certain embodiments thereof which are illustrated in the appended drawings. These drawings form a part of the specification. It is to be noted, however, that the appended drawings illustrate preferred embodiments of the invention and therefore are not to be considered limiting in their scope.

FIG. 3A shows the steps for retrieving encryption file data. FIG. 3B shows the steps for the minifilter process for a read request. FIG. 3C shows the steps for the minifilter process for a write request.

DETAILED DESCRIPTION OF THE INVENTION

Figure 1:
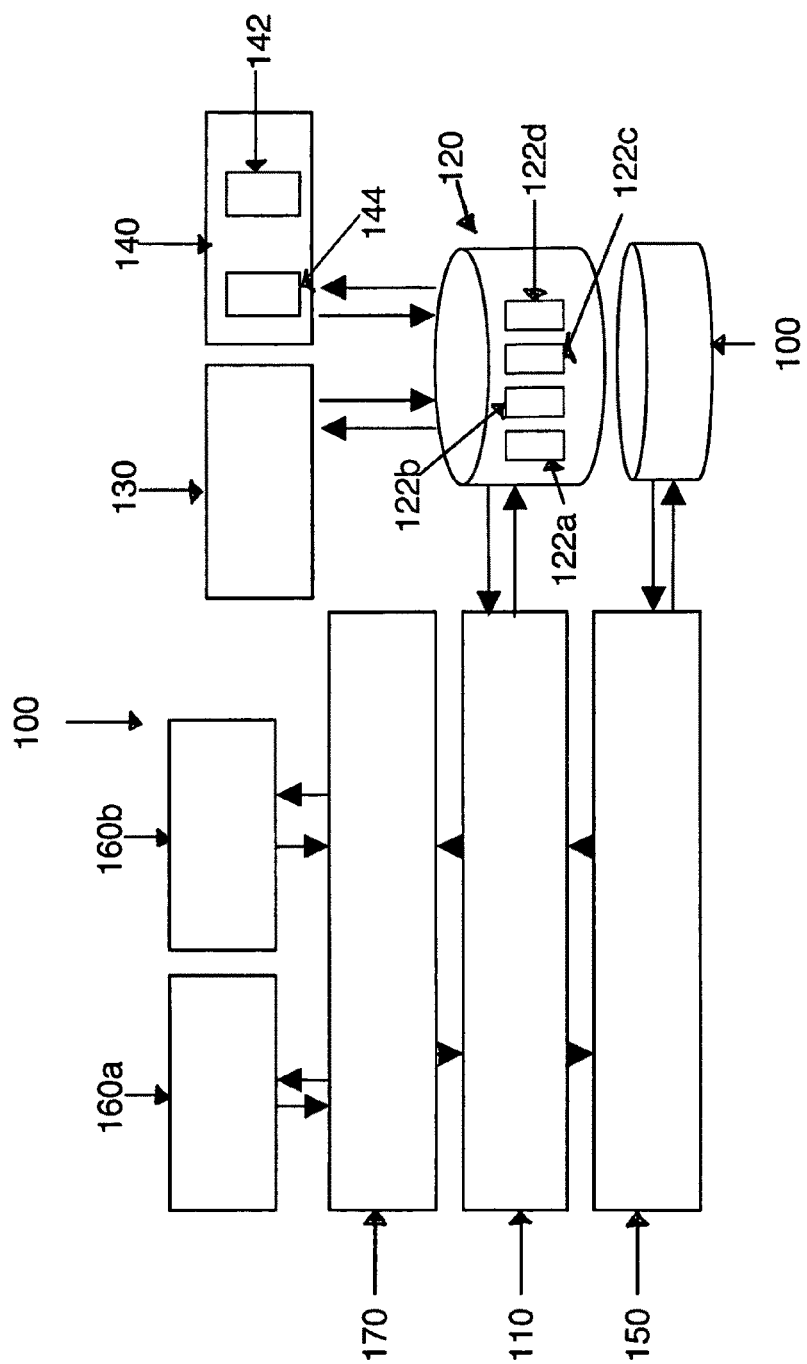
FIG. 1 depicts an overview of the components and interactions of Integrated File Level Cryptographical Access Control system.

As used herein, the term "a" or "an", when used in conjunction with the term "comprising" in the claims and/or the specification, may refer to "one," but it also is consistent with the meaning of "one or more," "at least one," and "one or more than one." Some embodiments of the invention may consist of or consist essentially of one or more elements, method steps, and/or methods of the invention. It is contemplated that any method or composition described herein can be implemented with respect to any other method or composition described herein.

As used herein, the term "or" in the claims is used to mean "and/or" unless explicitly indicated to refer to alternatives only or the alternatives are mutually exclusive, although the disclosure supports a definition that refers to only alternatives and "and/or."

As used herein, the term "symmetric key encryption" refers to encryption that uses the same key for encryption and decryption.

As used herein, the term "asymmetric key encryption" refers to encryption that utilizes two keys for encryption, one key to encrypt and one key to decrypt.

As used herein, the term message digest refers to an algorithm to compute a hash sum of a message. This sum can be used for data integrity and sender authentication.

As used herein, the term dynamic link library refers to a module of code that can be loaded and executed during runtime.

As used herein, the term "File System" refers to a method for storing and retrieving computer files on a data storage device. The File System Gateway is not reliant on any given file system. However, this does not imply platform independence.

As used herein, the term "computer" refers to computer(s) comprising at least a memory, a processor, and one or more network connections, as is standard and commonly known in the art. Computer readable media also are well-known and utilized in the art and can tangibly store computer executable instructions that upon execution enable a processor to carry out the instructions. As such, a computer program product comprises a computer memory medium that also tangibly stores computer readable and executable instructions and are well-known in the art.

In one embodiment of the present invention there is provided a system for controlling access to secure computer files, comprising a local computer having a memory, a processor and one or more network connections, further comprising an encryption database to store information relating to encrypted files and encryption algorithms; a user interface communicatively linked to the encryption database; an administrator interface communicatively linked to the encryption database independently of the user interface; and a file system gateway communicatively linked to the encryption database. Further to this embodiment the system may comprise one or more applications storable on one or more computer-readable storage media and executable by the processor; and a file system to store files in and to retrieve files from a data storage device in the computer.

In both embodiments the file system gateway resides as a layer above and independently of any file system on the computer. Also, the interactions of the file system gateway within the system are transparent to a user of the system. In addition, the file system gateway may comprise a minifilter module and a windows service module communicatively linked. The minifilter module is configured to provide encryption services and encrypted file information to the minifilter module. The windows service module is configured to provide encryption services and encrypted file information to the minifilter module. Furthermore, the information in the encryption database may be stored in an at least an encrypted file table and an algorithm table. Further to this the encryption database information may also be stored in one or both of a user table or an exception field table.

Also in both embodiments the administrator interface is communicatively linked only to the encryption database. The administrator interface further may comprise an interface for the system configuration and an encrypted file viewer. In addition the user interface may comprise a program to enable a display of one or more of a list of secured files, a list of paths to encrypted files and the files modifiers, or a list of encryption algorithms used to encrypt the files for a logged in user.

In another embodiment of the present invention there is provided a computer program product comprising a computer memory medium on which are tangibly stored computer readable instructions which, when executed on one or more computer processors, enables operation of the system for controlling access to secure files on a local computer described herein.

In yet another embodiment of the present invention there is provided a method for controlling access to secure files on a local computer, comprising a) installing the system for controlling access to secure files, as described supra, onto a local computer having a memory, a processor and one or more network connections; b) intercepting an application call requesting access to file in a file system on the computer via the file system gateway comprising the system, said gateway performing the further actions of; c) querying the encryption database to determine if the file is secured; d) receiving the file security information from the encryption database; e) sending the application request down to the file system, said file system acting upon the request and returning information retrieved from the requested file up to the file system gateway; f) decrypting any secured information; and g) returning the decrypted information to the calling application, where the actions of the file system gateway are transparent to the calling application.

In this embodiment, the file system gateway may comprise a minifilter module which intercepts the application call whereby steps c) and d) comprise determining if the call is one or both of a read request or a write request; communicating to the file system gateway window service module the name and file path of the requested file; querying the encryption database via the window service module; retrieving encrypted file information from the encryption database; receiving from the window service module encryption data for the requested file; and attaching the encryption data to an internal file object.

In one aspect the call is a read request and the method further comprises calculating the amount of data to be read to decrypt the requested file. In another aspect the call is a write request and the method further comprises calculating the encrypted data length and offset; communicating the write data, calculated encrypted length and offset to the window service module for encryption; and receiving from the window service module the processed encrypted write file data.

Further to this embodiment, the method comprises, via the administrator interface, adding new encryption algorithms to a dynamic link library; configuring group access files; creating a list of all encrypted files in the system; updating a list of available encryption algorithms and message digests; manually encrypting or decrypting selected files, locking files against modification, flagging folders for encryption, associating an encrypted file with its encryption algorithm; and identifying users with access to the files.

Further still to this embodiment, the method may comprise, via the user interface, one or more steps performed by a logged-in user of displaying a list of secured files, including paths to encrypted files, file modifiers and the encryption algorithm used for each file; changing a password; and obtaining authentication to access a secure file. Also in this further embodiment, the method may comprise the steps of selecting a new file to be secured; selecting an encryption algorithm; entering an authentication for the file; encrypting the selected file with the encryption algorithm; and adding the secured file to a list of secured files for the user.

In yet another embodiment of the present invention there is provided a computer program product comprising a computer memory medium on which are tangibly stored computer readable instructions which, when executed on one or more computer processors, perform the method for controlling access to secure files on a local computer, as described supra.

In yet another embodiment of the present invention there is provided one or more computer readable media having tangibly stored thereon a plurality of instructions that, when executed by one or more processors, causes the one or more processors to perform actions to a) intercept an application call to request access to a file in a file system on a computer via the file system gateway; b) query the encryption database to determine if the file is secured; c) receive the file security information from the encryption database; d) send the application request down to the file system; e) decrypt any secured file information returned from the file system after acting upon the request; and f) return the decrypted information to the calling application, where the processor performs the actions transparently to the calling application.

In this embodiment the actions a) to f) are performed independently of the file system. Also in this embodiment the computer executable instructions, when executed for steps a) to f), cause the processor(s) to determine if the call is one or both of a read request or a write request; communicate to the file system gateway window service module the name and file path of the requested file; query the encryption database via the window service module; retrieve encrypted file information from the encryption database; receive from the window service module encryption data for the requested file; and attach the encryption data to an internal file object.

In one aspect of this embodiment the call is a read request and the one or more computer readable media further comprise computer executable instructions that, when executed, cause the processor(s) to calculate the amount of data to be read to decrypt the requested file. In another aspect of this embodiment the call is a write request and the one or more computer readable media further comprise computer executable instructions that, when executed, cause the processor(s) to calculate the encrypted data length and offset; communicate the write data, calculated encrypted length and offset to the window service module for encryption; and receive from the window service module the processed encrypted write file data.

Further to this embodiment one or more computer readable media comprise computer executable instructions that, when executed, cause the processor(s) to enable an interface for an administrator. Further still, the one or more computer readable media comprise computer executable instructions that, when executed, cause the processor(s) to add new encryption algorithms to a dynamic link library; configure group access files; create a list of all encrypted files in the system; update a list of available encryption algorithms and message digests; manually encrypt or decrypt selected files, lock files against modification, flag folders for encryption, associate an encrypted file with its encryption algorithm; and identify users with access to the files.

In another further embodiment one or more computer readable media comprise computer executable instructions that, when executed, cause the processor(s) to enable an interface for a logged-in user. Further still, the one or more computer readable media comprise computer executable instructions that, when executed, cause the processor(s) to display a list of secured files, including paths to encrypted files, file modifiers and the encryption algorithm used for each file; change a password; and obtain authentication to access a secure file. Also, in this further embodiment the computer executable instructions that, when executed, cause the processor(s) to select a new file to be secured; select an encryption algorithm; enter an authentication for the file; encrypt the selected file with the encryption algorithm; and add the secured file to a list of secured files for the user.

Provided herein are an Integrated File Level Cryptographical Access Control (IFLCAC) encryption system, methods, computer program products and computer readable media for securing files via symmetric key and asymmetric key encryption and decryption that gives the security and flexibility of file level cryptography with the ease of use of file system cryptography. The IFLCAC system and method will not introduce a new weak link into a secure system. The IFLCAC encryption system and method allows better portability of the file security system, i.e., it performs regardless of the underlying file system such that it can be implemented over file system cryptography or virtual partition cryptography if called for. Additional administrative requirements ensures that IFLCAC is easily expandable or updatable and allows access to a file by both a single user, either a standard user or an administrator, or by a group of users. Due to the ever-changing nature of the security environment, the IFLCAC system and method is designed to be modular enough to replace the encryption algorithm used.

Generally, specified files are added to the system by a user and the file is encrypted via symmetric key encryption. The secured file information is added to an encryption database for use upon file interactions. When a secure file is accessed, authentication is requested from the user and all file interactions are encrypted and decrypted. The encryption and decryption is performed via an additional program that intercepts file requests and secures access to the encrypted file. The file interactions are secured transparently to the user and application with the exception of the authentication upon file access.

More particularly, upon adding a file to be secured, the system requests a key for single user access, or generates a random private key for group access. The file is secured via symmetric key encryption utilizing the key. The file information, which includes data such as file path and encryption algorithm used, is stored in the encryption database. When a secure file is opened for access, the file information is retrieved from the database and the user accessing the file authenticated. As the application in user mode access the data, the requested data from the file is decrypted for the application and conversely any data written to the file is encrypted before writing. Performing the secure file access in this manner ensures that the file is not stored in an unsecured format, even in the event of a computer crash. In the case of group access to files, including assigning an administrative key, the random key is use to secure the file. The random key is then encrypted with each user's or administrator's public key and stored in the database secured. Upon file access the authentication given is used to decrypt the random key from the encryption database before file access begins.

Accessing secure files via this method has many advantages over the current standard, for example, but not limited to, the reduction of user involvement and the ease of updating the encryption algorithm. With less user involvement the user is more likely to utilize the file security on more sensitive files that they previously deemed unworthy of security due to difficulty in accessing. It has the additional property of not requiring the user to secure the file after use, thus eliminating a potentially major security concern. The other major advantage this method holds is the removal or addition of encryption methods. In the case of a depreciated algorithm all files secured via the depreciated algorithm are quickly flagged for securing via a new algorithm, where as the old standard forced the user to remember all the files secured by the depreciated algorithm. Additionally, the design inherently grants secured transmission of files being accessed from a network drive; this is due to the decryption taking place on the local computer.

The Integrated File Level Cryptographical Access Control system is designed to be flexible and expandable. Thus, the IFLCAC system can be configured to provide additional services above file level encryption. For example, such services may be, but are not limited to, group access to a secure file, data integrity check on a file, and secure access to a file over a networked mapped drive.

One of the drawbacks to using prior file level cryptography is the lack of group access support. It is a common scenario that a select group of users require access to a single secure file. Previously this was handled by distributing a shared key among the users. With IFLCAC the users can access a single secure file with different passwords. Each user is assigned an asymmetric key pair which can be utilized to communicate secure data between users, either on a shared machine or over a computer network. When a file is selected for secure group access, the file is encrypted utilizing a symmetric key cipher with either a key specified by the current user, or a random key. Following the file encryption, the file key is encrypted using each group member's public key. The encrypted file key is then transmitted to that user's database. When a group member attempts to access the file, the member is prompted for their asymmetric private key information. Upon providing the proper asymmetric key, the file's encryption key can be obtained from the encrypted key stored in the database. Finally the group access file can be decrypted utilizing the secure key.

Data integrity is a common requirement for many computer systems. A method to ensure that a selected file is not modified unexpectedly, and if modified, to ensure that the user is notified that the file was modified by an outside source is a required function. With IFLCAC the user can select a file and a hash algorithm to enable data integrity monitoring on the file. A hash value is computed for the file and stored in the encryption database, and the file is flagged for monitoring by the system. When the user attempts to access a data integrity monitored file, a new hash value is computed from the file on disk and compared to the existing hash in the database. If the two hash values are not identical, the user is notified that the file was modified by an outside source. The hash value in the database can be updated by the user by saving a monitored file though normal means in his chosen application.

In addition, the Integrated File Level Cryptographical Access Control system provides secure access to files over networked mapped files. This is enabled because the IFLCAC system resides on the local computer, rather than a remote computer. The end user need not perform any special operations to encrypt and access the files, they interact exactly the same as local files. Secure transmission is achieved by performing all encryption and decryption of data on the local computer; this ensures that all data being transmitted over the network is in an encrypted format.

Embodiments of the present invention are better illustrated with reference to the Figures, however, such reference is not meant to limit the present invention in any fashion. The embodiments and variations described in detail herein are to be interpreted by the appended claims and equivalents thereof.

FIG. 1 depicts the layering of the Integrated File Level Cryptographical Access Control 100 elements on the file request stack and the interactions therebetween. The system comprises four main elements, the file system gateway 110, encryption database 120, user interface program 130, and administrator interface program 140. The file system gateway sits just above the file system layer and intercepts calls made to the file system 150. The encryption database stores the necessary information regarding the encrypted files. The user interface provides a simple program interface for the end user. The administrator interface provides program access to the methods configuration options. All encryption and hash algorithms are stored in the encryption database in dynamic link libraries exporting a pre-defined interface thereby allowing for easy insertion and updating of the algorithms.

The file system gateway 110 is a critical element of the cryptography method. It is in this element that all encryption and decryption of data will occur; as well as controlling all communication between the upper application layers 160*a,b* and the underlying file system. The gateway communicates exclusively with the encryption database. The gateway watches and executes code for all incoming calls to the underlying file system through the operating system 170 and checks the unique name or open file pointer passed with the call. The unique name from the file is used as an index into the encryption database. The file information is retrieved via a query from the encryption database and checked to see if any cryptographical operations are required to be performed on the file. If operations are required, the proper encryption algorithm dynamic link library is loaded into memory. The cryptographical operations are performed, via a function call into the encryption algorithm module just loaded into memory, and the resulting data is sent back to the application.

A novel aspect of the file system gateway is that it is implemented as a layer above the file system and, as such, it must remain completely independent of the file system. This includes depending on any given file system's unique file pointer information. Additionally in order to implement some special functionality relating to parsing the unique names for a given file system, an additional dynamic link library can be used. The only location for file system dependence is within this library.

The File System Gateway calculates the encryption key based on the user's password upon logging into the system. Additional passwords to open files encrypted with a different key must be retrieved directly from the user. This adds the requirement that the gateway resides on the client machine if accessing a distributed file system. Performing the cryptography on the user machine allows for a minimum trust relationship, the communicating entities need not worry about the security of the other, between the local computer and the remote file system. Additionally performing the cryptography on the user machine removes the necessity for asymmetric key cryptography, a secure but computationally expensive method for two entities to communicate with prior communications, to be performed before communication between the remote file server and the local computer.

The File System Gateway may be implemented in a two-part system comprising a windows minifilter driver module 112 and a windows service module 114. Splitting the gateway into two or more components is useful if the computer operating system, e.g., a Windows operating environment, such as Windows XP, has limitations on file request interceptions. The minifilter driver module 112 of the file system gateway is the most crucial component in the system. This component gets executed upon every file system request encountered in the system and, as such, the component is created to be efficient. The minifilter driver module executes inside the Windows kernel mode, this was necessary to intercept the file system requests from all applications executing on the local computer. As currently implemented, the minifilter driver processes all file system requests regarding opening files, reading data, and writing data. The minifilter driver communicates extensively with the file system gateway windows service. Optionally, a cache for recently accessed files that optimally resides in the minifilter driver would increase greatly the speed of the system, thus eliminating even the need to communicate the file open request for non-encrypted files.

The File System Gateway windows service 114 is tightly coupled with the minifilter driver. The window service controls and communicates with the driver, providing encryption services as well as encrypted file information. There are four requests handled for the minifilter driver, i.e., encrypted file check, encrypted write file check, encrypt data, and decrypt data.

The most used channel of communication is between the minifilter driver and the file system gateway windows service. This channel of communication is utilized on virtually every file open, file read, and file write. Communication between the encryption database and any other component utilizes the MySQL ADO object. This object allows an application created in a .NET language to easily perform queries and modifications to a MySQL database. All queries were created and implemented via the ADO object. Utilizing stored procedures would have granted an increase in performance for the most used queries, specifically the queries originating from the windows service, but time constraints restricted their creation.

The Encryption Database 120 is used to store all information relating to the encrypted files and is accessible to all parts of the integrated cryptography system. Every call to open a file queries the encryption database. The encryption database comprises the file system database and the configuration options database for the system. The file system database stores information regarding which files are encrypted and which encryption algorithm was used to encrypt the file. The name and path to the file are used as the primary key into the file system level. Optional file level attributes include a message digest of the file and a link into the public key table for multiple user access. The configuration options database contains information on the available dynamic link libraries, current file system in use, and other general options, such as password rules and administrative settings.

The Encryption Database holds all necessary information to allow correct access to the file system. However, should the database fail, the system is configured to access the administrator program to decrypt files manually. If communication with the encryption database is unavailable, the gateway enters an invisible state, simply returning the data directly as it resides on the storage disk 180. This state will allow normal operations on non-encrypted files, while encrypted files will be accessed via the administrator program interface.

The Encryption Database may be implemented as a A MySQL database was utilized as the encryption database with MySQL ADO installed to allow easy communication between C# applications and the database. The database comprises of four tables, i.e., an encrypted file table 122a and an installed encryption algorithm table 122b and, optionally, may further comprise a user table 122c, and an exception file table 122d.

The encrypted file table 122a stores information on all files encrypted using integrated file level cryptographical access control. This information includes a unique file ID, the file path, the encryption algorithm used, the encryption operation, and the user who encrypted the file. The majority of queries entering the system will be utilizing the file path or the unique file ID; as such indexes were created over both these criteria.

The installed encryption algorithm table 122b stores information regarding the installed encryption methods. This table holds a unique encryption method ID, the file path to the module, the algorithm type, the block size of the algorithm, and the display name. Only a single index is required for this table, over the encryption method ID. This allows a fast retrieval of the encryption method information given an ID, such as from the encrypted file table. The block size information and display name are not explicitly required, but are included for connivance and a small speed improvement. Storing the block size in the database allows the file system gateway windows service to return the block size without explicitly loading the encryption method dynamic link library.

The user table 122c stores basic user information, including a unique ID, the user name, a hash of the user's password and an encrypted default password. No explicit indexes are required over the user table, as access to this table is done very infrequently.

The exception file table 122d stores a list of files that can not be selected for encryption. This list comprises primarily the integrated file level cryptographical access control implementation files and associated database information. The file system gateway window service stores this list in memory; as such the list should be kept fairly short. This list ensures that no database query is required for files being loaded to execute a database request.

The User Interface Program 130 allows the end user, particularly a non-computer literate end user to interact with the integrated file level encryption system. The program displays a list of secured files, including paths to encrypted files and the files modifiers, and which encryption algorithms were used for the logged in user. This application also allows basic maintenance for the user such as changing the password and getting authentication to access a secure file. For all users without administrative access this program will be the only interface into the system.

The Administrator Interface Program 140 allows configuration and maintenance of the system and advanced access to the database. Only the administrator program enables manual encryption and decryption of files. Also, the administrator program communicates only with the encryption database.

Also, the program enables the addition of new encryption algorithms, the depreciation of current encryption algorithms, as well as other basic system configuration options. The administrator interface program also provides a list of all secured files in the system and with which encryption algorithm they were secured.

More particularly, the Administrator Interface Program itself comprises two interfaces, i.e., the system configuration interface 142 and the encrypted file viewer 144. The system configuration interface 142 allows the administrator to perform general configuration and maintenance to the system, such as adding new encryption algorithm dynamic link library and configuring group access files. The encrypted file view 144 creates a list of all encrypted files. Through this interface the administrator can select and manually encrypt and decrypt available files, update the list of available encryption algorithms and message digests, and, optionally, lock files against modification and flag folders for encryption. Other modifiers can be updated on the files such as the encrypted algorithm used and which users have access to the files.

Figure 2:
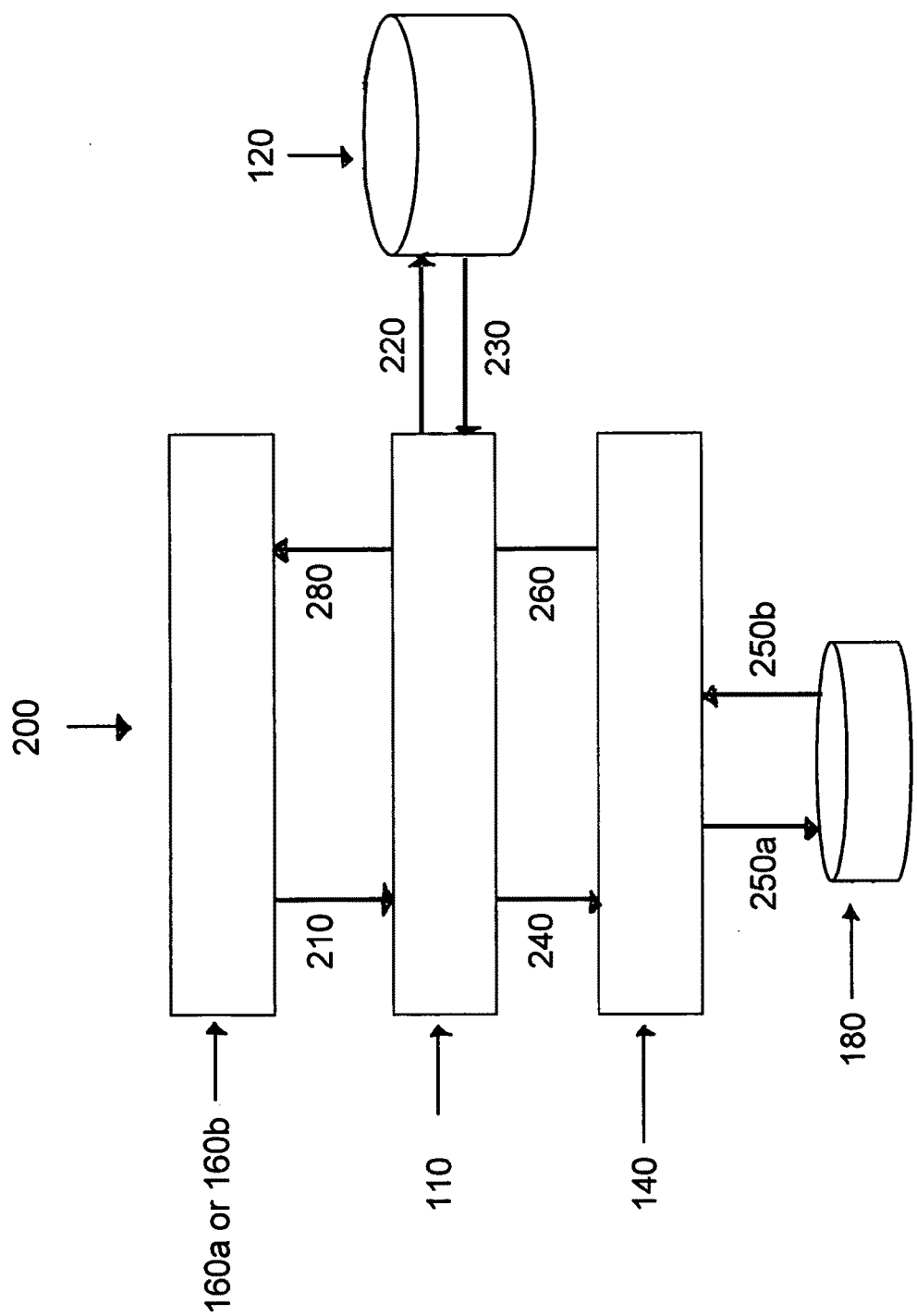
FIG. 2 is an example of a read file access that depicts how the file request is intercepted and processed by the different components.

FIG. 2, with continued reference to FIG. 1, is an illustration of the general steps in the integrated cryptography method for a sample file request entering the system. Generally, the most common interaction is a simple single user decryption for a file being opened. In step 210, the application 160*a* or 160*b* makes a call requesting access to a secure file from the file system 150. The File System Gateway 110 intercepts the request and communicates with the Encryption Database 120 whereupon the file's unique name is searched through the database of modified files to determine if the file is secured and with which encryption algorithm the file is secured at step 220. If the file is located, the encryption database returns the file security information to the file system gateway at step 230 where, if modification to the file request is required, the gateway loads the encryption algorithm and, if necessary, the message digest algorithm from the appropriate dynamic link libraries to modify the file request. At step 240, the file system gateway sends the request down to the file system layer 150, i.e., the file stream is opened via the normal file layer calls. The file system layer handles the request. All the necessary data is logged into a memory list via interaction at steps 250*a,b* with the storage disk 180 to support multiple files being opened simultaneously. At step 260 the file system layer returns the information up the stack 100 to the file system gateway. The file system gateway decrypts any secured information from the file at step 270 and the decrypted information, i.e., the open file pointer, is returned to the calling application 160*a* or 160*b* at step 280.

For a file read request, the open file is only decrypted enough to fill the request from the calling application. File writes are slightly more complicated depending on the encryption algorithm used. Many symmetric key algorithms encrypt data in blocks of a set size. Before the data can be formally written to the disk, either a full block or a file close is required. Finally closing the file completes any outstanding data encryption. The single user file access needs to utilize only the symmetric key algorithms. Through these steps the application layer is unaware that any cryptography took place in the lower stacks.

Figure 3A:
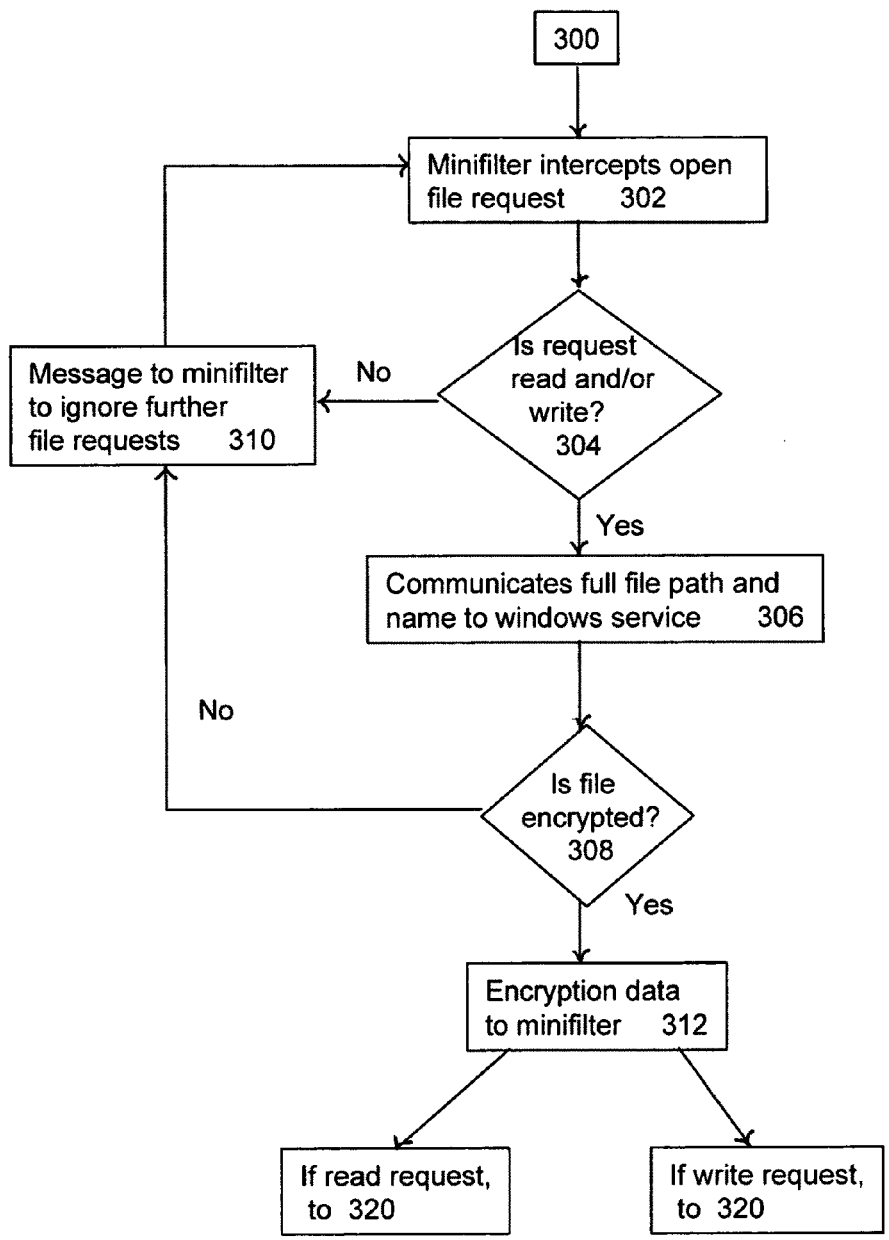
FIGS. 3A-3C are flowcharts depicting the minifilter driver execution and the windows services processes.
Figure 3B:
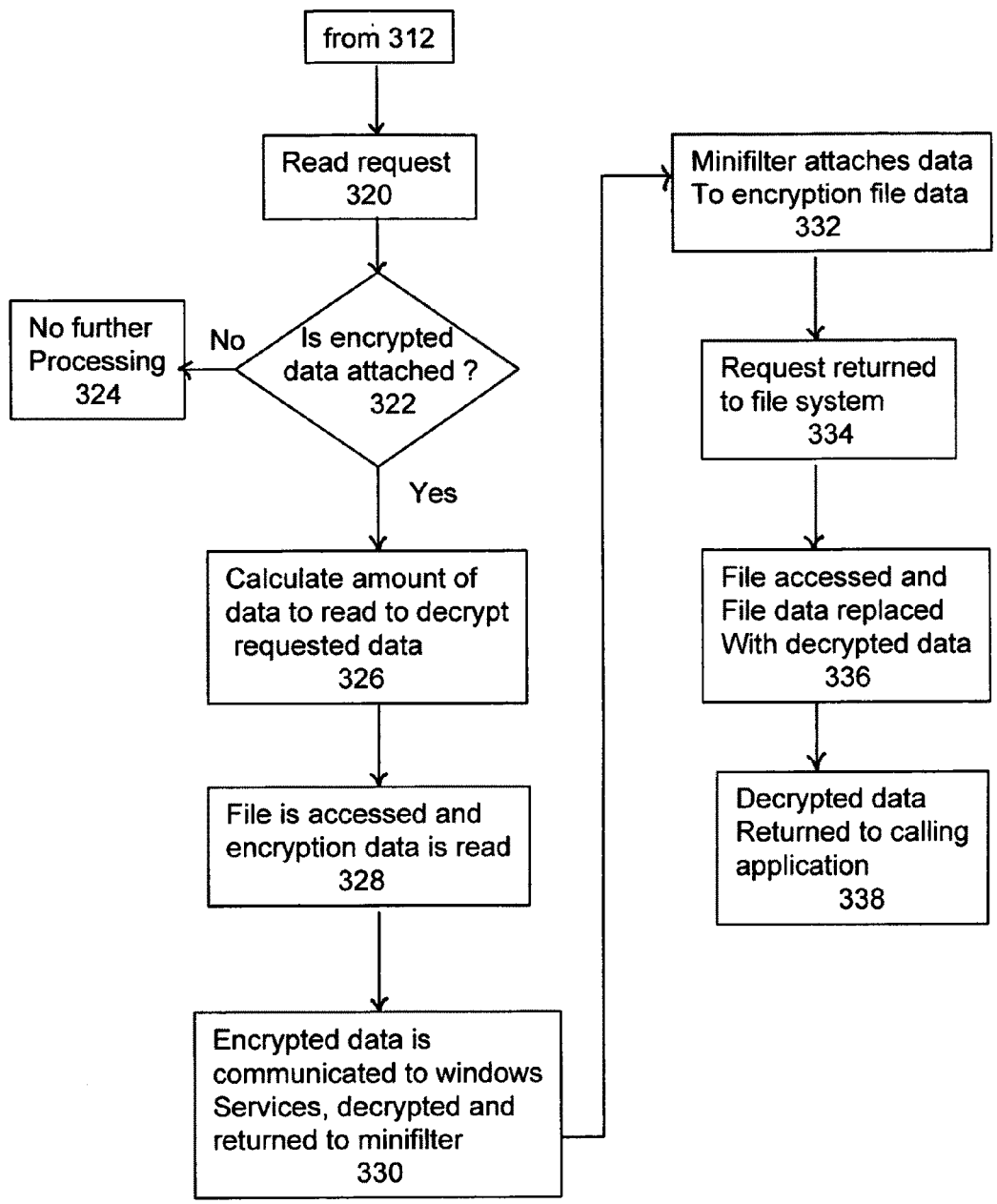
Figure 3C:
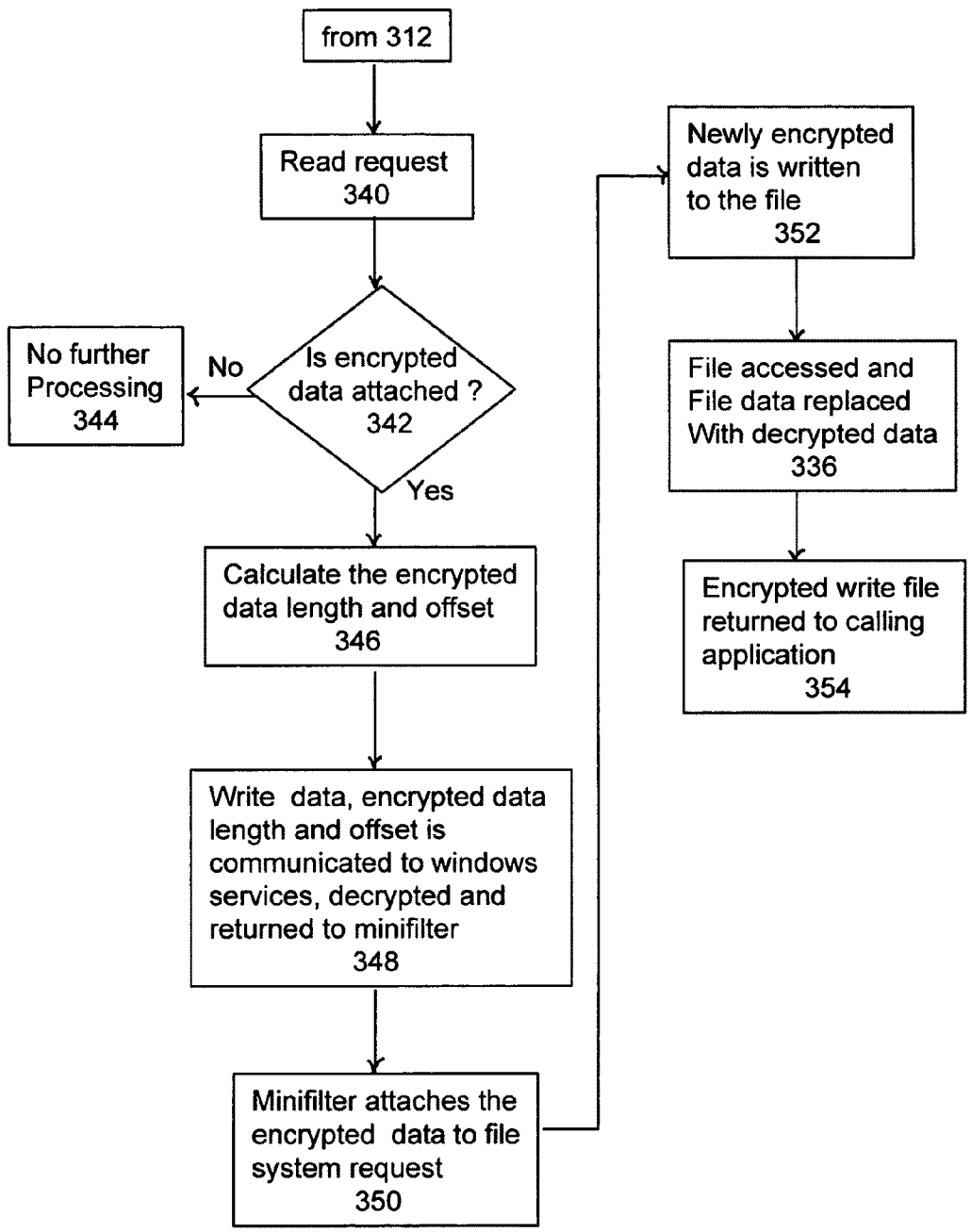

FIGS. 3A-3D are flowcharts depicting the minifilter driver execution and the windows services processes. FIG. 3A is a flowchart showing the steps for retrieving encryption file data 300. Upon a user program opening a file, the minifilter intercepts the file open request for processing at step 302. The minifilter driver mode checks the file open mode, either write, read, or both at 304, and processes the request slightly differently if the file must be written to. The minifilter driver communicates to the file system gateway window service the full file path and name being requested at 306. The windows service replies to the minifilter driver with the file encryption data if the file being accessed is encrypted at 308, otherwise the service informs the minifilter driver to ignore any additional file system requests for the file at 310. When an encrypted file is encountered, the minifilter driver attaches the encryption file data, for example, a file ID, algorithm block size, and file open mode) to the internal file object at 312. The file data can be retrieved in the subsequent read and write operations that can occur on the open file as shown in FIGS. 3B-3C.

FIG. 3B is a flowchart showing the minifilter process for a read request 320. Upon encountering a file read request, the minifilter first checks for the attached encryption file data at 322. If no encryption file data is located, the minifilter driver does no additional processing on the request at 324. If encryption file data is encountered for the file request, the minifilter driver calculates the actual amount of data necessary to be read in order to successfully decrypt the requested data at 326. The minifilter driver then accesses the file and reads the necessary encrypted data at 328. The encrypted data is communicated to the windows service 350, where the data is decrypted and returned to the minifilter driver 330. The minifilter driver attaches the data to the encryption file data at 332 and allows the file request to continue to the file system 150 at 334. Upon file access completion, the returned data is replaced with the decrypted data from the encryption file data at 336. The decrypted data is then returned to the calling application 160*a* or 160*b* at 338.

FIG. 3C is a flowchart showing the minifilter driver process for a write request 340. Upon a file write request, the minifilter driver again checks for the attached encryption file data at 342. If no encryption file data is located, the minifilter driver does no additional processing on the request at 344. If processing is required, the minifilter driver calculates the necessary encrypted data length and offset at 346. The write data and calculated encrypted length and offset are transmitted to the file system gateway window service 114 to be processed at 348. The encrypted data is returned to the minifilter driver 112 and attached to the file system request at 350. The newly encrypted data is then written to the file at 352 and returned to the calling application 354 as for a read request.

Figure 3D:
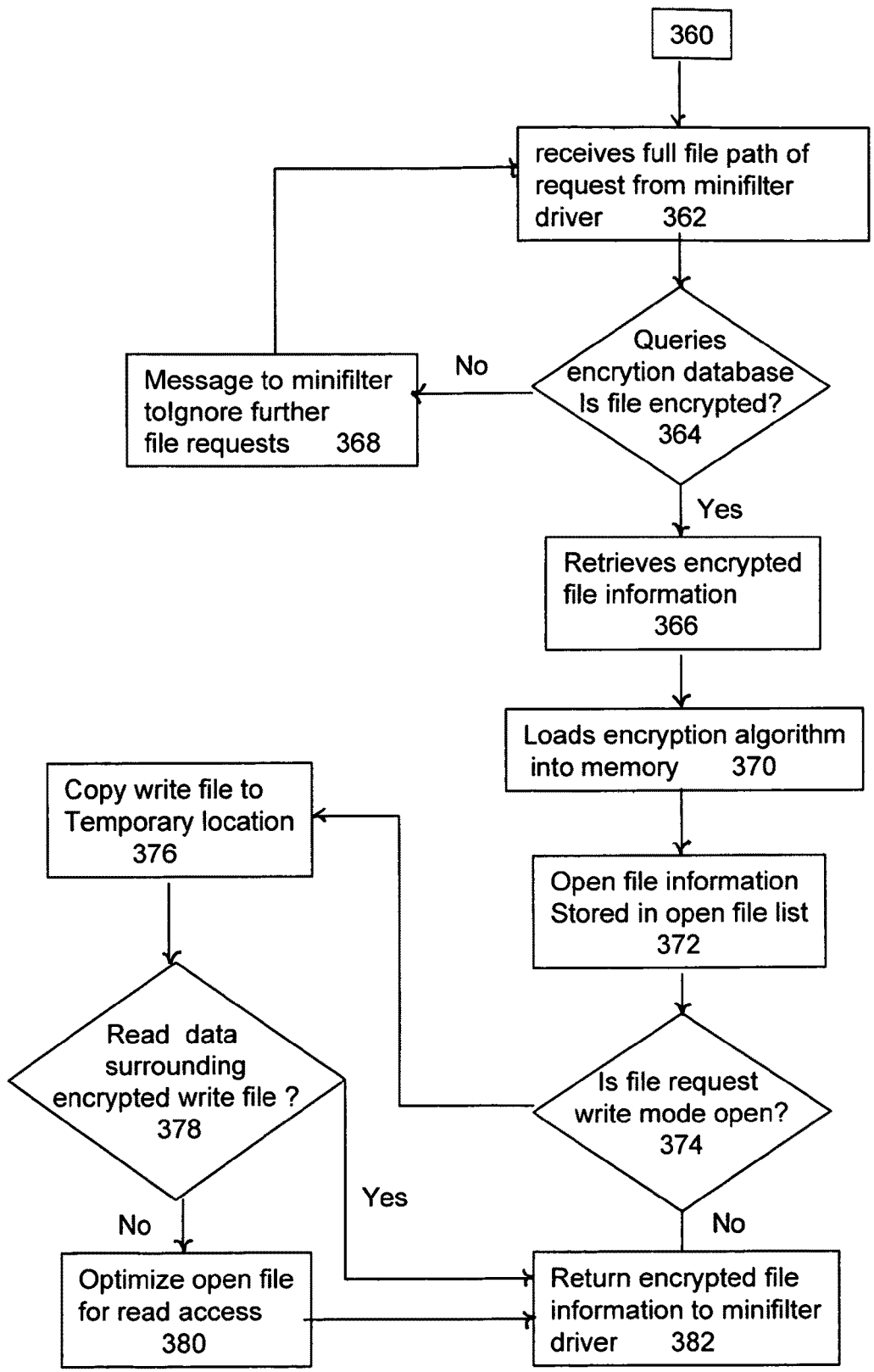
FIG. 3D shows the windows service process for the minifilter driver.

FIG. 3D is flowchart depicting the windows service process 360 for the minifilter driver comprising encrypted file check, encrypted write file check, encrypt data, and decrypt data. The encrypted file check and encrypted write file check operate very similarly. The minifilter 112 sends a request 362 to the windows service 114 containing the full file path being accessed. The windows service queries the database to see if the file is encrypted 364, and if so, retrieves the encrypted file information 366, otherwise the service informs the minifilter driver to ignore any additional file system requests for the file 368. Encrypted file information includes a unique ID for the file, the encryption algorithm used, the file path, and the user ID that encrypted the file. Upon locating an encrypted file request, the algorithm is loaded into memory 370, if necessary, and the open file information is stored into an open file list 372. If the file request was for a write mode open, the file is copied to a temporary location 374 to ensure that file data surrounding an encrypted write could be read 376. If the data surrounding an encrypted write is lacking 378, the encrypted information written to file could modify more data than requested. The file copy should be able to be optimized out, as the minifilter driver can manipulate the file open modes to ensure that encrypted files have read access as well 380. The encrypted file information is sent back to the minifilter driver and the file open request is allowed to complete 382.

The encrypt data request from the minifilter is called to encrypt data being written to the file. Before the data can be encrypted, the actual amount of data to be written and the actual offset of the data must be calculated. This is dependent on the encryption block size; for example AES has a block size of 16 bytes. After calculating the necessary information, the service may need to read the old data from the temporary file; this information ensures that the encrypted blocks do not overwrite data that was not modified by the calling application. The previous data is read into a buffer and decrypted then the data to be written to the file is then copied over the existing data, starting at the correct offset into the file. The newly modified data is summarily encrypted and written to the temporary file, this ensures the temporary file is kept in sync with the data on disk. Finally, the data is returned to the minifilter driver for writing.

The decrypt data request from the minifilter is called to decrypt data being read from a file. As the data coming from the minifilter contains all necessary data to be decrypted, proper block size and correct offset into the file, the data is immediately sent to the decryption algorithm and returned to the minifilter.

The file system gateway service was created using C#, this allowed module reuse with the rest of the applications and a quicker development time. Unfortunately, C# has greater overhead than C/C++, it executes as interpreted language requiring additional processing and memory overhead. An additional obstacle arose when communication with the minifilter driver was required. The minifilter communication and control module was created in C, invoking functions between C# and C sustains additional overhead. While the file system gateway service operates, it is not optimized.

The file system gateway windows service and the user application communicate to retrieve passwords from the operating user. This communication is implemented using .NET's IPC object. The user application registers with the file system gateway windows service during initialization. The file system gateway service requests passwords from the user application via this communication channel.

Figure 4:
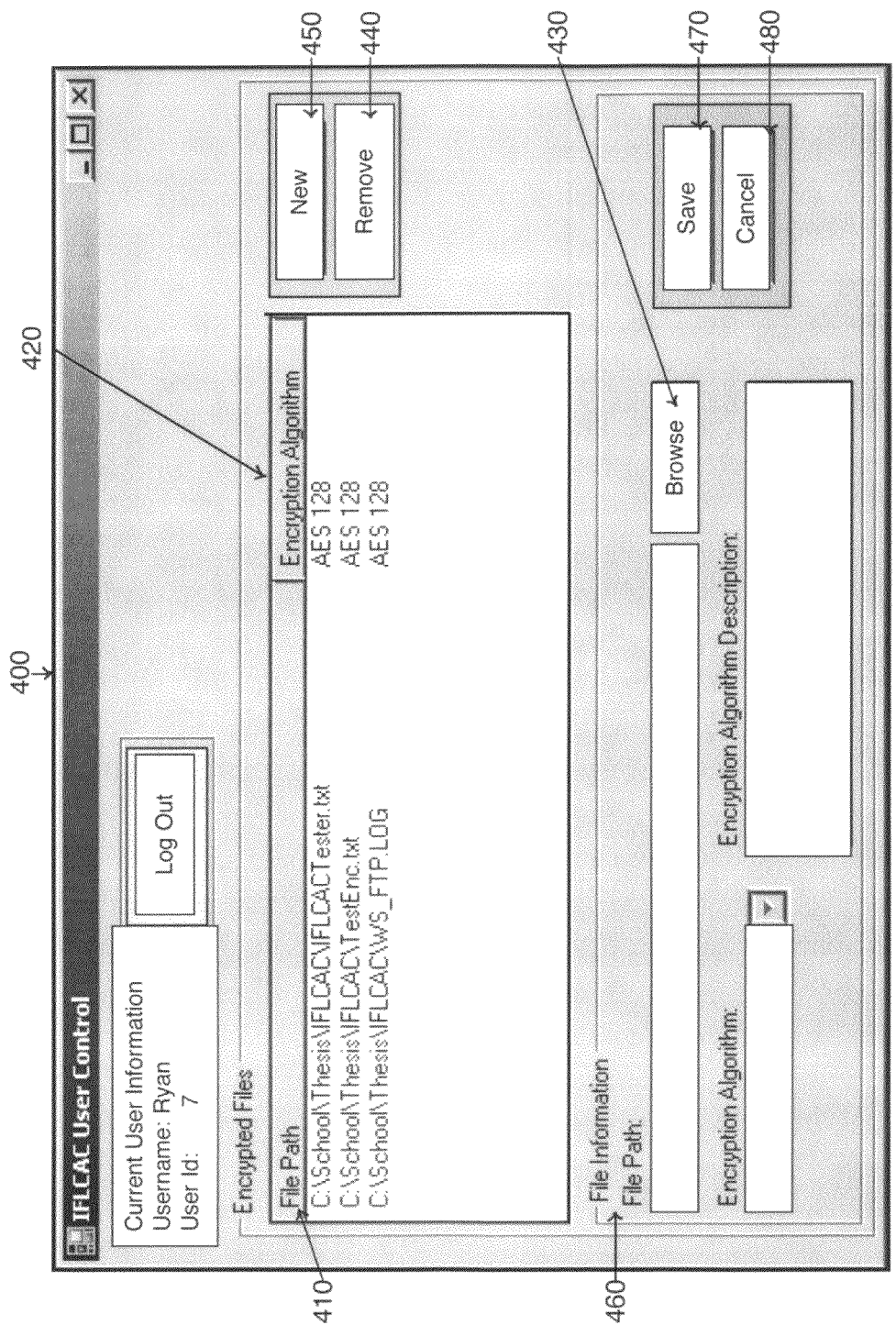
FIG. 4 depicts the User Application Interface.

FIG. 4, with continued reference to FIG. 1, depicts the User Interface 400. The User Interface is simple and intuitive to use. After logging into the system, the user is shown their list of encrypted files 410 and the encryption algorithms 420 used to encrypt them. Also, the user may browse files at 430. The user can decrypt files and remove them from the system via the 'Remove' button 440. The user can add new files via the 'New' button 450 and enter the required file information at 460 and save or cancel the same via the respective Save 470 or Cancel 480 buttons. The user application was created using C#, and communicates with the encryption database 120 and the file system gateway service 114. The file system gateway service utilizes the user application to retrieve passwords from the user. Communication with the encryption database is done via the MySQL ADO object.

FIGS. 5A-5D depict the Administrator Interface 500 which is used to configure the IFLCAC cryptography system. The interface allows the user to install new encryption algorithms, create new users, set exception files and upkeep encrypted files. The application can encrypt and decrypt files for any user. The password to the file is still required which allows the administrator a method to decrypt files in the case of a file system gateway malfunction.

Figure 5A:
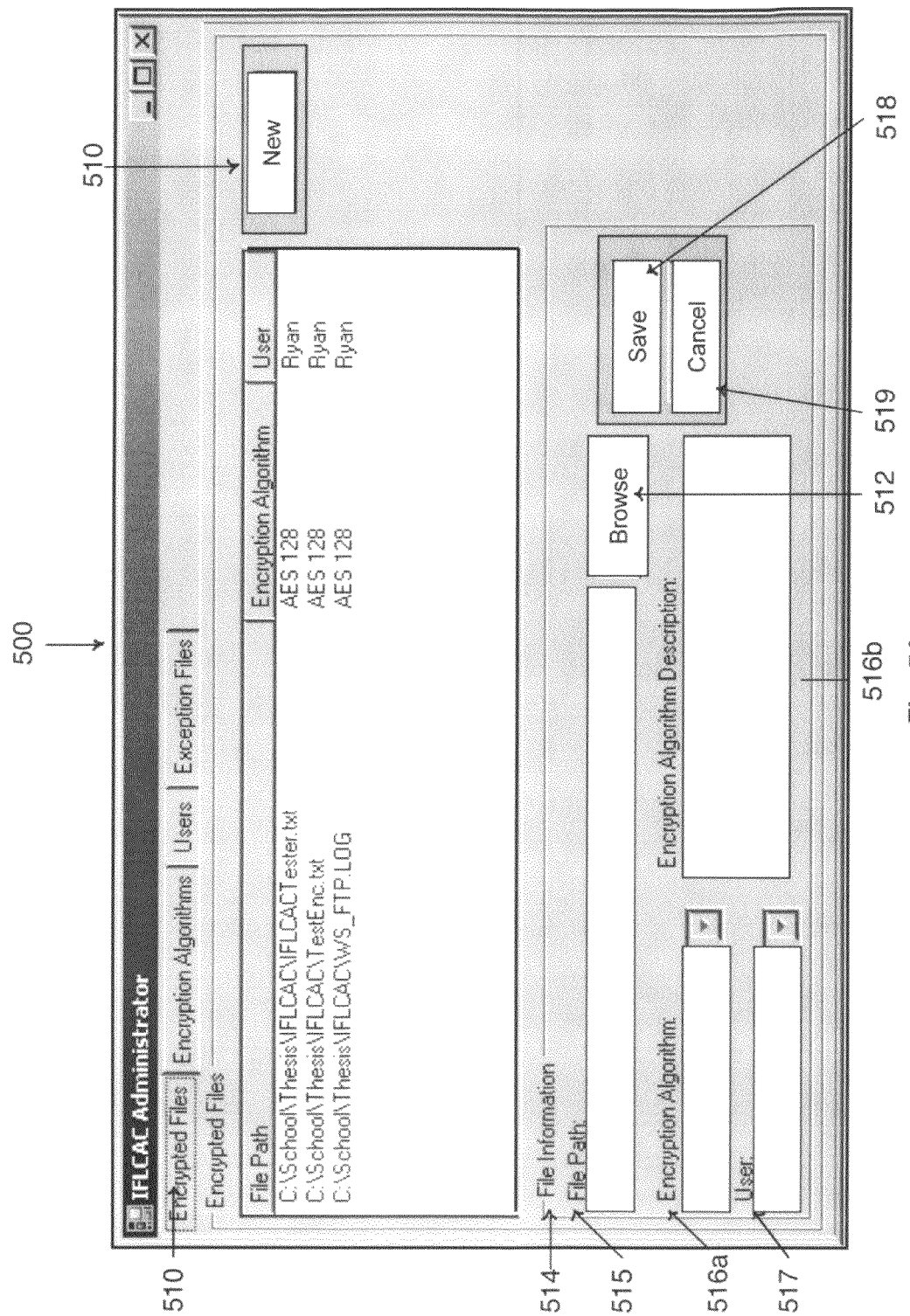
FIGS. 5A-5D depict the Administrator Application Interface showing the encrypted files tab (FIG. 5A), the encryption algorithm tab (FIG. 5B), the users tab (FIG. 5C), and the exception files tab (FIG. 5D).

FIG. 5A shows the Encrypted Files Tab 510 on the interface 500. After logging in to the system, the administrator is shown a list of encrypted files 511 on the system including the encryption algorithm used to encrypt the file and the user who added the file to be encrypted. Also, the administrator may browse the encrypted files at 512. A new encrypted file may be added via the New button 513. The administrator enters the new file path 515, the encryption algorithm 516a with its corresponding description 516b used to encrypt the new file and the user 517 to whom the new encrypted file belongs at the file information panel 514 and may save or cancel entry via the Save 518 or Cancel 519 buttons.

Figure 5B:
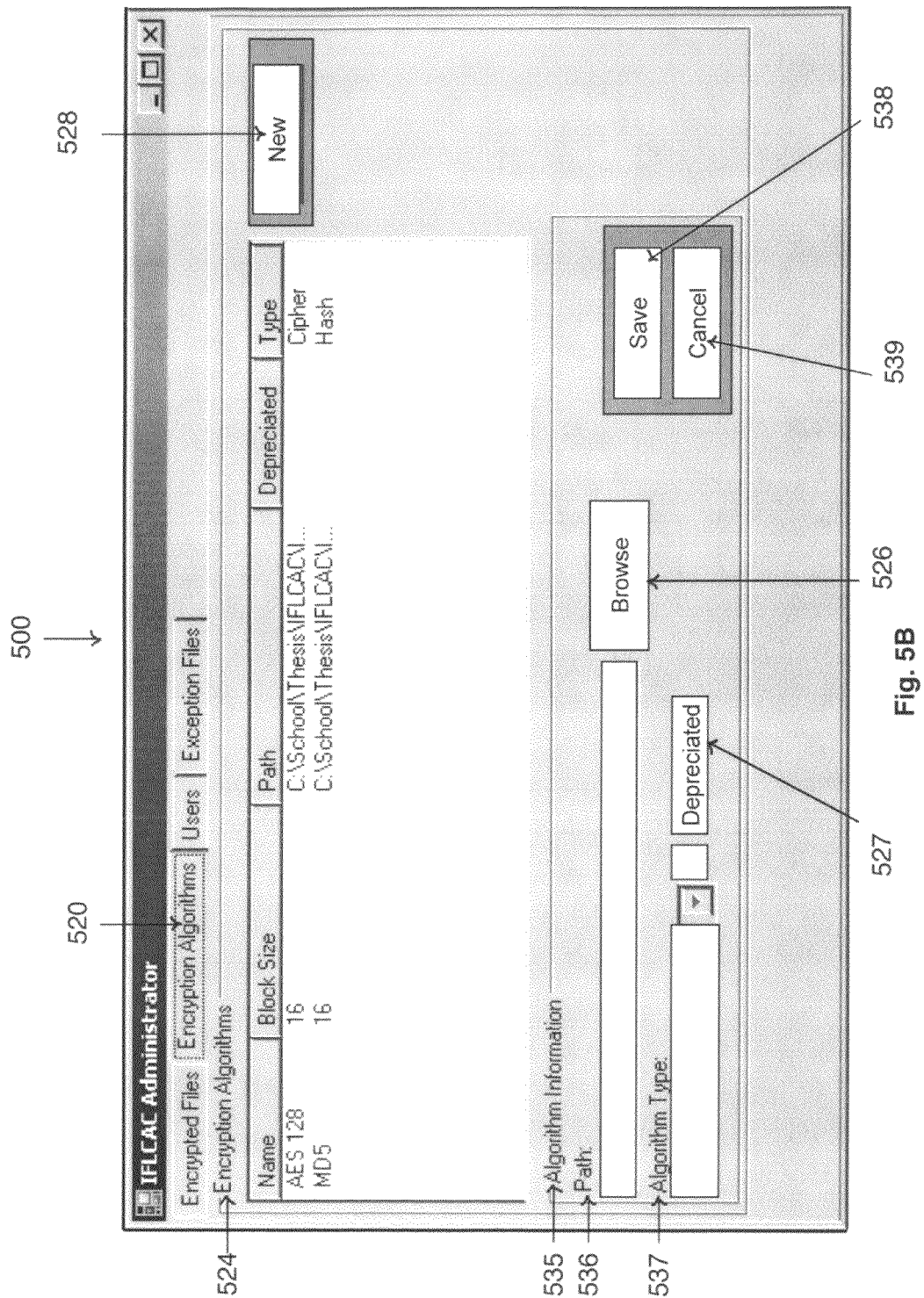

FIG. 5B shows the Encryption Algorithm Tab 520 on the interface 500. This tab displays all the installed encryption algorithms for the system. After logging in to the system, the administrator is shown a list of encryption algorithms 524 including the block size, path, type and whether the algorithm has been depreciated. Also, the administrator may browse the encryption algorithms at 526. A new encryption algorithm may be installed via the New button 528. The administrator enters the new algorithm path 536 and algorithm type 537 at the algorithm information panel 535 and may save or cancel entry via the Save 538 or Cancel 539 buttons. The administrator also can depreciate existing encryption algorithms by checking the box 527. Upon depreciating an algorithm, all encrypted files with that algorithm will be flagged for modification via the administrator application and the user application. The next time a user logs in, he is prompted to modify the encryption algorithm used for files encrypted with the depreciated algorithm.

Figure 5C:
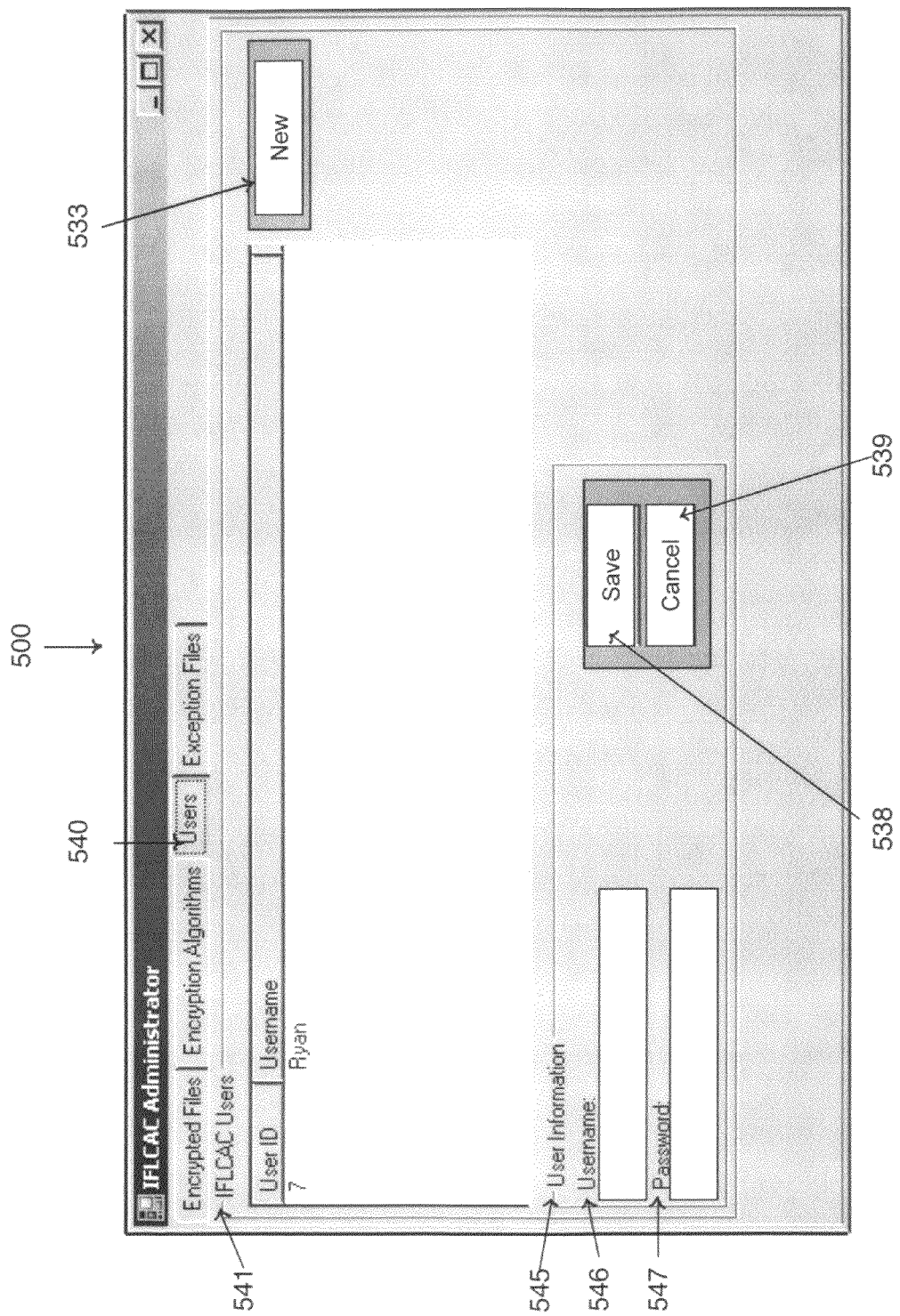

FIG. 5C shows the Users Tab 540 on the interface 500. This tab allows the administrator to upkeep the users for the integrated file level cryptographical access control system. After logging in to the system, the administrator is shown a list of users 541. A new user may be entered via the New button 543. The administrator enters the new user name 546 and password 547 at the user information panel 545 and may save or cancel entry via the Save 548 or Cancel 549 buttons. This is the only method for adding new users to the system.

Figure 5D:
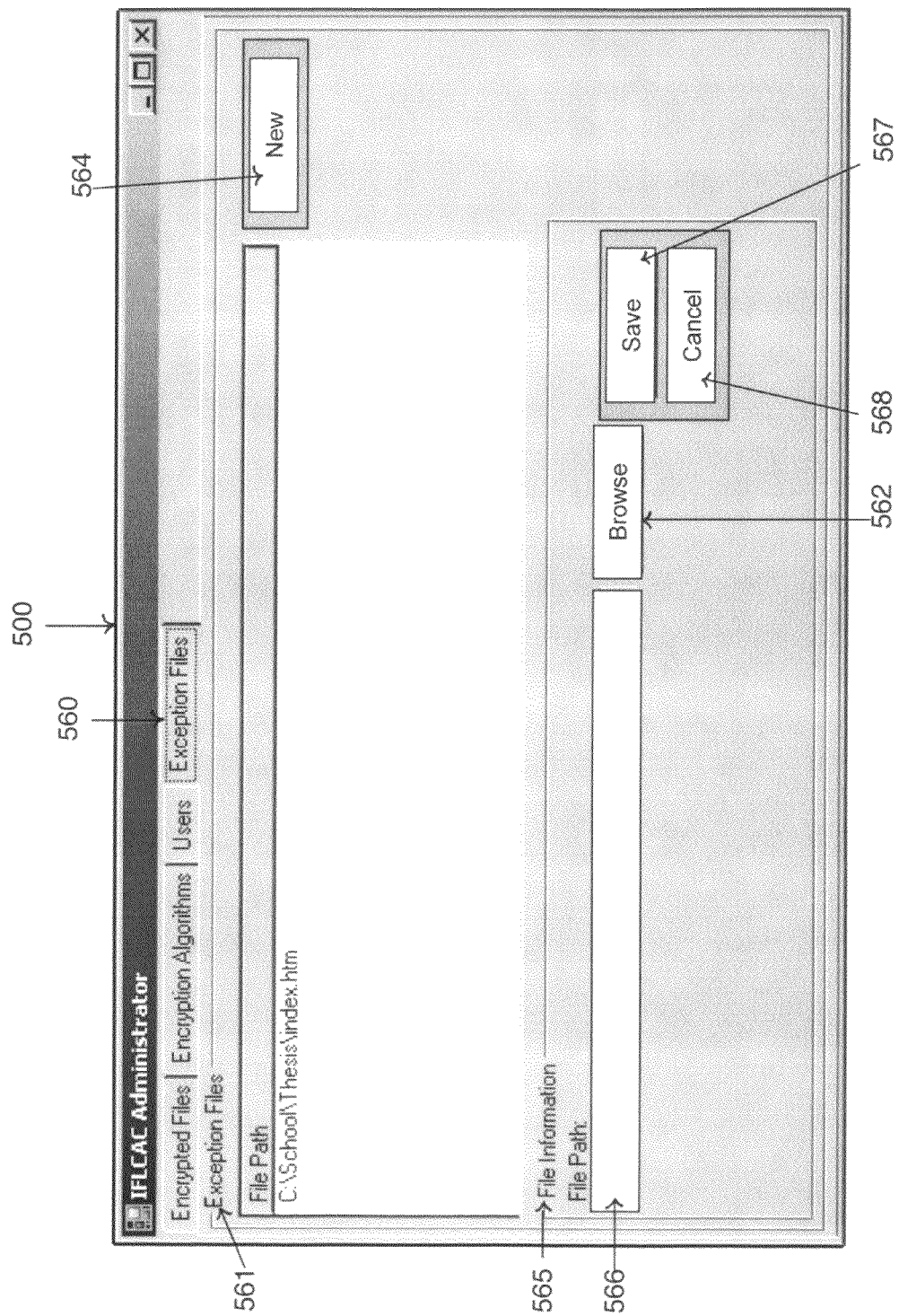

FIG. 5D shows the Exception Files Tab 560 on the interface 500. This tab allows the administrator to add files that are restricted from encryption via the IFLCAC system. After logging in to the system, the administrator is shown a list of restricted files 561. Also, the administrator may browse restricted files at 562. A new file to be restricted from encryption may be entered via the New button 564. The administrator enters the file path information at 566 at the file information panel 565 and save or cancel entry via the Save 567 or Cancel 568 buttons.

The Integrated File Level Cryptographical Access Control system and method can be utilized to secure any file. For example, Microsoft excel is a common application users utilize frequently to store information regarding sales, customers, and even payroll data. Much of this data can be considered sensitive and as such should be secured. Securing such a file via Integrated File Level Cryptographical Access Control allows the user to maintain almost the same sequence of actions to access the file, regardless of their preferred method to access the file.

The first step to securing the file though IFLCAC is adding the file to the secured list. The user interfaces with the system though the user application. The user presses a button to signify adding a file to the system, then selects the file to add. After the file selection has completed, the user selects the encryption algorithm to be used from a list of algorithms. Finally the user enters the authentication for the file and the file is secured by the selected encryption algorithm. After the encryption of the file completes the now secured file is added to the list of secured files for the user.

Accessing the newly secured file adds only a single step to the user's sequence of actions for accessing the file. For instance the user will access the file via a shortcut to the file, or even the file itself, off their desktop. The user will select and execute the file, and via normal operations on the operating system, an appropriate application is started and the application attempts to access the file. At the time of file access the user application requests authentication from the user. After authentication is successfully completed the file is accessed normally by the user.

From the user's perspective only a single simple change has occurred, authentication before accessing the file, but hidden behind that IFLCAC is performing many operations to ensure the file is accessed securely. To access the file, the user utilizes an application; that application performs the file interactions for the user. When the application attempts to read or write to the file for the first time, the file system gateway accesses the encryption database to check if the file being accessed is a secured file, and, if so, will request authentication from the user. The file system gateway then prepares to encrypt or decrypt the file interaction, possibly modifying the original file request to process enough information for the encryption algorithm to properly secure the file interaction.

In parallel to retrieving the data from disk, the file system gateway loads the encryption algorithm module into memory via a call into 'LoadLibrary' for a Windows implementation. In the case of writing, the information being written to the file is secured and then sent to the file system; with the file results returned to the waiting application. In the case of reading, the data is read from the file system then decrypted and returned to the waiting application. All the interactions from the file system gateway are transparent to the user, except for the authentication for file access.

One skilled in the art will appreciate readily that the present invention is well adapted to carry out the objects and obtain the ends and advantages mentioned, as well as those objects, ends and advantages inherent herein. The present examples, along with the molecules, specific compounds, methods, procedures, treatments, etc. described herein are presently representative of preferred embodiments, are exemplary, and are not intended as limitations on the scope of the invention. Changes therein and other uses will occur to those skilled in the art which are encompassed within the spirit of the invention as defined by the scope of the claims.

What is claimed is:

1. A method for controlling access to secure files on a local computer, comprising:
    a) installing a system for controlling access to secure files onto a local computer having a memory, a processor and one or more network connections, said system comprising:
        an encryption database to store information relating to encrypted files and encryption algorithms;
        a user interface communicatively linked to the encryption database;
        an administrator interface communicatively linked to the encryption database independently of the user interface; and
        a file system gateway residing on the local computer as a layer above and independent of any file system on the computer and communicatively linked only to the encryption database, said file system gateway comprising a minifilter module configured to intercept the application call;
    b) intercepting an application call requesting access to file in a file system on the computer via the file system gateway comprising the system, said gateway performing the further actions of:
    c) determining if the call is one or both of a read request or a write request via said minifilter module;
    d) communicating to the file system gateway window service module the name and file path of the requested file through said minifilter module;
    e) querying the encryption database via the window service module and said minifilter module;
    f) retrieving encrypted file information from the encryption database through said minifilter module;
    g) receiving from the window service module encryption data for the requested file through said minifilter module;
    h) attaching the encryption data to an internal file object through said minifilter module;
    i) sending the application request down to the file system, said file system acting upon the request and returning information retrieved from the requested file up to the file system gateway;
    j) decrypting any secured information; and
    k) returning the decrypted information to the calling application, wherein the actions of the file system gateway are transparent to the calling application.

2. The method of claim 1, wherein the call is a read request, the method further comprising:
    calculating the amount of data to be read to decrypt the requested file.

3. The method of claim 1, wherein the call is a write request, the method further comprising:
    calculating the encrypted data length and offset;
    communicating the write data, calculated encrypted length and offset to the window service module for encryption; and
    receiving from the window service module the processed encrypted write file data.

4. The method of claim 1, wherein via the administrator interface, the method further comprises one or more steps performed by an administrator of:
    adding new encryption algorithms to a dynamic link library;
    configuring group access files;
    creating a list of all encrypted files in the system;
    updating a list of available encryption algorithms and message digests;
    manually encrypting or decrypting selected files,
    locking files against modification,
    flagging folders for encryption,
    associating an encrypted file with its encryption algorithm; and
    identifying users with access to the files.

5. The method of claim 1, wherein via the user interface, the method further comprises one or more steps performed by a logged-in user of:
    displaying a list of secured files, including paths to encrypted files, file modifiers and the encryption algorithm used for each file;
    changing a password; and
    obtaining authentication to access a secure file.

6. The method of claim 5, further comprising, the steps of:
    selecting a new file to be secured;
    selecting an encryption algorithm;
    entering an authentication for the file;
    encrypting the selected file with the encryption algorithm; and
    adding the secured file to a list of secured files for the user.

7. A computer program product tangibly stored on a non-transitory computer-readable media, said computer program product comprising computer readable instructions which, when executed on one or more computer processors, perform the method of claim 1.

8. The method claim 1, said system further comprising:
one or more applications storable on one or more computer-readable storage media and executable by the processor; and
a file system to store files in and to retrieve files from a data storage device in the computer.

9. The method of claim 8, wherein the interactions of the file system gateway within the system are transparent to a user of the system.

10. The method of claim 8, wherein said minifilter module is communicatively linked to a windows service module.

11. The system of claim 10, wherein the windows service module is configured to provide encryption services and encrypted file information to the minifilter module.

12. The method of claim 1, wherein the information in the encryption database is stored in at least an encrypted file table and an algorithm table.

13. The method of claim 12, wherein the information is stored further in one or both of a user table or an exception field table.

14. The method of claim 1, wherein the administrator interface further comprises an interface for the system configuration and an encrypted file viewer.

15. The method of claim 1, wherein the user interface comprises a program to enable a display of one or more of a list of secured files, a list of paths to encrypted files and the files modifiers, or a list of encryption algorithms used to encrypt the files for a logged in user.

16. One or more non-transitory computer readable media having tangibly stored thereon a plurality of instructions that, when executed by one or more processors, causes the one or more processors to perform actions to:
a) intercept an application call to request access to a file in a file system on a local computer via a file system gateway that resides on the local computer as a layer above and independent of any file system on the computer, said file system gateway communicatively linked only to an encryption database comprising the file system;
b) query the encryption database via the file system gateway to determine if the file is secured;
c) receive the file security information from the encryption database;
d) send the application request down to the file system;
e) decrypt any secured file information returned from the file system after acting upon the request;
f) return the decrypted information to the calling application, wherein the processor performs the actions transparently to the calling application; and
g) enable an interface for an administrator to:
  i) add new encryption algorithms to a dynamic link library;
  ii) configure group access files;
  iii) create a list of all encrypted files in the system;
  iv) update a list of available encryption algorithms and message digests;
  v) manually encrypt or decrypt selected files;
  vi) lock files against modification;
  vii) flag folders for encryption;
  viii) associate an encrypted file with its encryption algorithm; and
  ix) identify users with access to the files.

17. The one or more non-transitory computer readable media of claim 16, wherein the computer executable instructions, when executed for steps a) to f), cause the processor(s) to:
determine if the call is one or both of a read request or a write request;
communicate to the file system gateway window service module the name and file path of the requested file;
query the encryption database via the window service module;
retrieve encrypted file information from the encryption database;
receive from the window service module encryption data for the requested file; and
attach the encryption data to an internal file object.

18. The one or more non-transitory computer readable media of claim 17, wherein the call is a read request, further comprising computer executable instructions that, when executed, cause the processor(s) to:
calculate the amount of data to be read to decrypt the requested file.

19. The one or more non-transitory computer readable media of claim 17, wherein the call is a write request, further comprising computer executable instructions that, when executed, cause the processor(s) to:
calculate the encrypted data length and offset;
communicate the write data, calculated encrypted length and offset to the window service module for encryption; and
receive from the window service module the processed encrypted write file data.

20. The one or more non-transitory computer readable media of claim 16, further comprising computer executable instructions that, when executed, cause the processor(s) to enable an interface for a logged-in user.

21. The one or more non-transitory computer readable media of claim 20, further comprising computer executable instructions that, when executed, cause the processor(s) to:
display a list of secured files, including paths to encrypted files, file modifiers and the encryption algorithm used for each file;
change a password; and
obtain authentication to access a secure file.

22. The one or more non-transitory computer readable media of claim 21, further comprising computer executable instructions that, when executed, cause the processor(s) to:
select a new file to be secured;
select an encryption algorithm;
enter an authentication for the file;
encrypt the selected file with the encryption algorithm; and
add the secured file to a list of secured files for the user.

* * * * *